United States Patent
Brooks

(10) Patent No.: US 7,155,859 B1
(45) Date of Patent: Jan. 2, 2007

(54) FISHING BOX

(76) Inventor: Truman Brooks, 4926 Dembigh Ct., Mays Landing, NJ (US) 08330

( * ) Notice: Subject to any disclaimer, the term of this patent is extended or adjusted under 35 U.S.C. 154(b) by 74 days.

(21) Appl. No.: 11/039,410

(22) Filed: Jan. 19, 2005

(51) Int. Cl.
*A01K 97/06* (2006.01)
*A01K 97/22* (2006.01)

(52) U.S. Cl. .................. 43/54.1; 206/315.11; 224/922; 62/457.1

(58) Field of Classification Search .............. 43/54.1; 206/315.11; 224/920; 62/457.1
See application file for complete search history.

(56) References Cited

U.S. PATENT DOCUMENTS

| | | | | | |
|---|---|---|---|---|---|
| 2,153,549 | A | * | 4/1939 | Cooper | 43/54.1 |
| 2,264,744 | A | * | 12/1941 | Dunnam | 43/54.1 |
| 2,357,214 | A | * | 8/1944 | McDole | 43/54.1 |
| 2,555,073 | A | * | 5/1951 | Zdankoski | 43/54.1 |
| 2,823,971 | A | * | 2/1958 | Hoyt | 43/54.1 |
| 3,128,137 | A | * | 4/1964 | Dokter | 206/315.11 |
| 3,395,550 | A | * | 8/1968 | Dungan | 62/457.1 |
| 3,997,181 | A | * | 12/1976 | Jaco et al. | 280/47.19 |
| 4,023,304 | A | * | 5/1977 | Singer | 43/54.1 |
| 4,128,170 | A | * | 12/1978 | Elliott | 43/54.1 |
| 4,353,182 | A | * | 10/1982 | Junkas et al. | 43/54.1 |
| 4,638,593 | A | * | 1/1987 | Garcia | 43/54.1 |
| 4,841,661 | A | * | 6/1989 | Moore | 43/54.1 |
| 4,873,841 | A | * | 10/1989 | Bradshaw et al. | 62/457.1 |
| 4,932,677 | A | * | 6/1990 | Shustack | 62/457.1 |
| 5,100,198 | A | * | 3/1992 | Baltzell | 43/54.1 |
| 5,159,777 | A | * | 11/1992 | Gonzalez | 43/54.1 |
| 5,163,694 | A | * | 11/1992 | Reichek | 43/54.1 |
| 5,259,215 | A | * | 11/1993 | Rocca | 62/457.1 |
| 5,285,656 | A | * | 2/1994 | Peters | 62/457.1 |
| 5,305,544 | A | * | 4/1994 | Testa, Jr. | 43/54.1 |
| 5,333,885 | A | * | 8/1994 | Pullman | 280/47.19 |
| 5,423,195 | A | * | 6/1995 | Peters | 62/457.1 |
| D378,456 | S | * | 3/1997 | Speicher | D34/25 |
| 5,630,537 | A | * | 5/1997 | Sciacca | 224/920 |
| 5,636,469 | A | * | 6/1997 | Pizzolo et al. | 43/54.1 |
| 5,755,057 | A | * | 5/1998 | Dancer | 43/54.1 |
| 5,864,981 | A | * | 2/1999 | Zeman | 43/54.1 |
| 5,881,874 | A | * | 3/1999 | McKinney | 206/315.11 |
| 5,941,015 | A | * | 8/1999 | Jenkins | 43/54.1 |
| 5,992,086 | A | * | 11/1999 | Cheng | 43/54.1 |
| 6,010,043 | A | * | 1/2000 | Williamson et al. | 62/457.1 |
| 6,076,298 | A | * | 6/2000 | Teel | 43/54.1 |
| 6,185,860 | B1 | * | 2/2001 | Thibodeaux | 43/54.1 |
| 6,269,587 | B1 | * | 8/2001 | Wallace | 43/54.1 |
| 6,311,991 | B1 | * | 11/2001 | Conrado et al. | 62/457.1 |
| 6,354,104 | B1 | * | 3/2002 | Feagin | 62/457.1 |

(Continued)

FOREIGN PATENT DOCUMENTS

AU        200030095 A  * 11/2000

(Continued)

*Primary Examiner*—Darren W. Ark
(74) *Attorney, Agent, or Firm*—Goldstein Law Office, PC

(57) ABSTRACT

A fishing box for easily and conveniently carrying several different items therein including a cooler and a tackle box. The cooler includes a main compartment and a secondary compartment. The main compartment, having wheels and a retractable handle, has a first lid which doubles as a seat back. A foldable and bendable seat fits within the main compartment. The secondary compartment has two shelving units underneath a tray. A lunch box and a cut bait box fit within the two shelving units. A tackle box fits within the tray. A second lid covers the secondary compartment and has a retractable rim for hold an additional tackle box therein. A plurality of fishing rod holders extend within the second lid and secondary compartment.

12 Claims, 5 Drawing Sheets

U.S. PATENT DOCUMENTS

| | | | |
|---|---|---|---|
| 6,374,532 B1 * | 4/2002 | Klein | 43/54.1 |
| 6,446,382 B1 * | 9/2002 | Cloutier et al. | 43/54.1 |
| 6,446,988 B1 * | 9/2002 | Kho | 62/457.1 |
| 6,487,814 B1 * | 12/2002 | Arredondo et al. | 43/54.1 |
| 6,691,451 B1 * | 2/2004 | Keenan | 43/54.1 |
| 6,742,789 B1 * | 6/2004 | Nowak | 43/54.1 |
| 6,883,267 B1 * | 4/2005 | Pruitt | 43/54.1 |
| 6,962,354 B1 * | 11/2005 | Miller | 43/54.1 |
| 2001/0006073 A1 * | 7/2001 | Patarra | 62/457.1 |

FOREIGN PATENT DOCUMENTS

| | | | | |
|---|---|---|---|---|
| EP | 388617 | A1 * | 9/1990 | |
| EP | 985344 | A1 * | 3/2000 | |
| EP | 1495677 | A1 * | 1/2005 | |
| FR | 2569948 | A1 * | 3/1986 | |
| FR | 2704725 | A * | 11/1994 | |
| GB | 2278032 | A * | 11/1994 | |
| GB | 2337685 | A * | 12/1999 | |
| GB | 2372202 | A * | 8/2002 | |
| GB | 2390795 | A * | 1/2004 | |
| GB | 2395412 | A * | 5/2004 | |
| GB | 2415166 | A * | 12/2005 | |
| JP | 8-298910 | A * | 11/1996 | |
| JP | 10-262531 | A * | 10/1998 | |
| JP | 10-276645 | A * | 10/1998 | |
| JP | 11-155451 | A * | 6/1999 | |
| JP | 2000-342148 | A * | 12/2000 | |
| JP | 2001-218545 | A * | 8/2001 | |

* cited by examiner

FISHING BOX

BACKGROUND OF THE INVENTION

The invention relates to a fishing box, and more particularly, to a fishing box for carrying several different boxes for storing fishing equipment, bait, food and beverages for easy transport.

Fishing, whether it be ocean, lake, stream or pond fishing, is not only the most popular but probably the oldest pastime pursued by man. Fishing is a popular sport because anyone can engage in it, regardless of age, sex, or income. Fishing can be enjoyed from childhood to old age, individually or in groups, with little more investment than a cane pole and a few hooks. Within an hour, from most homes, there is usually a place to fish. Perhaps the greatest appeals to fishing are the opportunity it offers to get outdoors, to enjoy the companionship of friends, to learn interesting facts about nature, and to use new and varied skills to outwit the fish. In the United States, many State, Federal and private organizations spend millions of dollars annually to keep a plentiful supply of fishes available for sportsmen to catch.

Usually, fishermen carry several boxes on fishing excursions for the storage of needed equipment and supplies, usually consisting of a tackle box, bait box, and cooler. Lugging several boxes around is definitely not an enjoyable part of fishing, especially when only one individual is involved.

U.S. Pat. No. 6,076,298 to Teel discloses a molded plastic wheeled fishing caddy comprised of a handle, food cooler, live bait compartment, tackle box, folding seat and means to hold a fishing rod. U.S. Pat. No. 5,864,981 to Zeman discloses a combination tackle box, bait box and cooler. U.S. Pat. No. D378,456 to Speicher discloses an ornamental design for a fishing caddy.

While these units may be suitable for the particular purpose employed, or for general use, they would not be as suitable for the purposes of the present invention as disclosed hereafter.

SUMMARY OF THE INVENTION

It is an object of the invention to produce a fishing box for easily and conveniently carrying several different boxes for storing fishing equipment. Accordingly, the invention is a fishing box having a cooler having a main compartment and a secondary compartment, for holding a lunch box, cut bait box, fishing rods, and a tackle box for easily and conveniently carrying fishing equipment.

It is another object of the invention to provide a fishing box that is easily transported. Accordingly, the fishing box includes a pair of wheels attached along an end of the main compartment opposite a handle, for easily transporting the fishing box.

It is another object of the invention to provide a fishing box that remains stabilized while on the ground. Accordingly, the invention has skid plates located on an underside of the main compartment for preventing slipping, sliding or skidding and thereby stabilizing the fishing box while on the ground.

It is another object of the invention to provide a fishing box capable of allowing a user to sit thereon. Accordingly, a first lid for covering a portion of the main compartment doubles as a seat back, while a removable seat cushion is installed within the main compartment for allowing a user to sit thereon.

It is another object of the invention to provide a fishing box capable of holding an additional tackle box thereon. Accordingly, the invention has a second lid for covering the secondary compartment, which has a rectangular rim having eye holes therethrough for placing an additional tackle box therein and securing the tackle box with bungee cords through the eye holes for easily carrying an additional tackle box thereon.

This invention is a fishing box for easily and conveniently carrying several different items therein including a cooler and a tackle box. The cooler includes a main compartment and a secondary compartment. The main compartment, having wheels and a retractable handle, has a first lid which doubles as a seat back. A foldable and bendable seat fits within the main compartment. The secondary compartment has two shelving units underneath a tray. A lunch box and a cut bait box fit within the two shelving units. A tackle box fits within the tray. A second lid covers the secondary compartment and has a retractable rim for hold an additional tackle box therein. A plurality of fishing rod holders extend within the second lid and secondary compartment.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
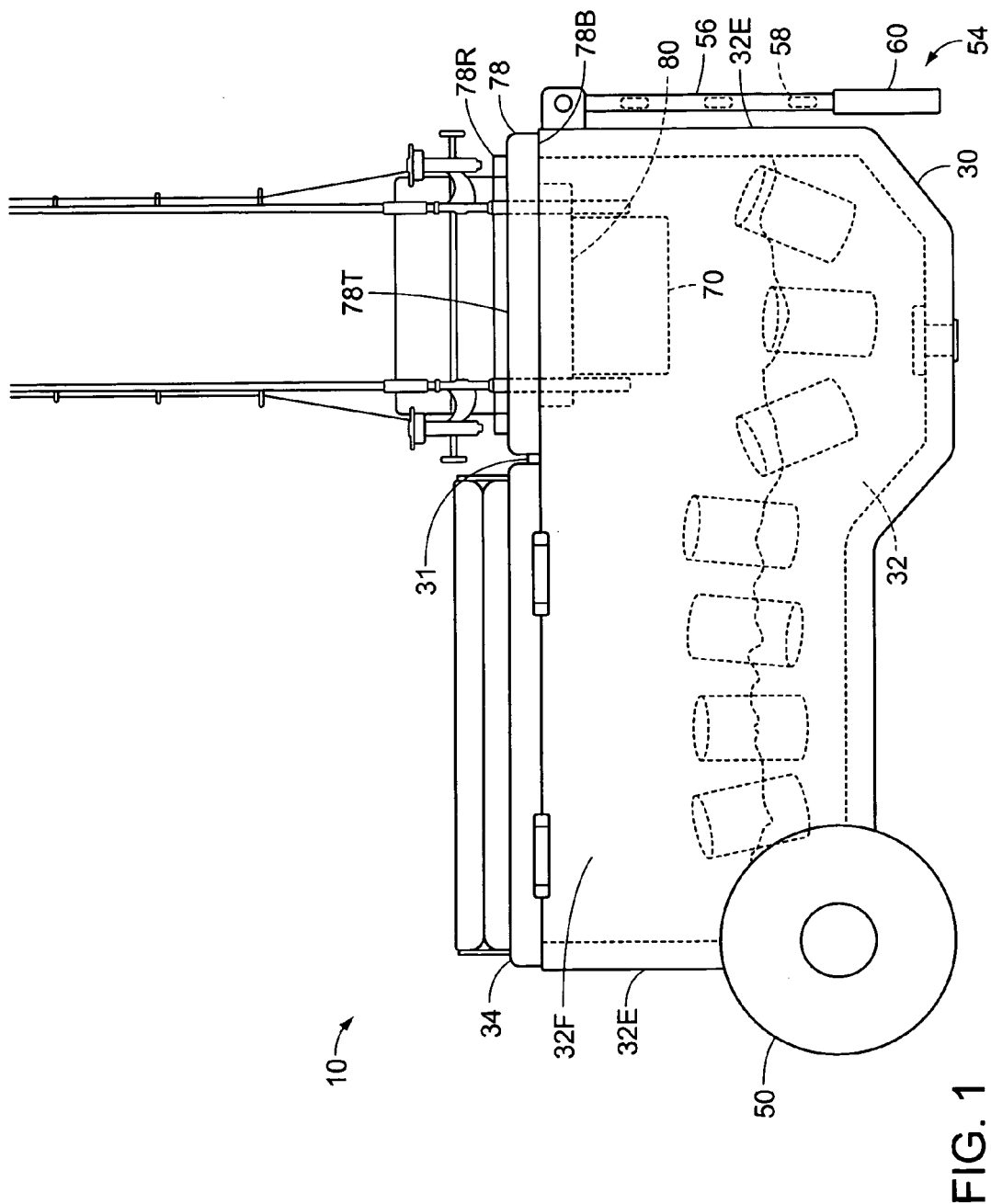
FIG. 1 is a diagrammatic perspective view of the fishing box of the present invention, having a cooler box and a tackle box.

FIG. 1 illustrates a fishing box 10 of the present invention for easily and conveniently carrying several different items therein. In the broadest context, the fishing box 10 includes a cooler 30 and a tackle box 80.

The cooler box 30 is a multi-purpose and insulated plastic cooler, having a main compartment 32 that is substantially rectangular in shape, and is used for holding cold beverage, ice and food therein. The main compartment 32 is preferable thirty-eight inches in length, eighteen inches in width, and eighteen inches in depth, and made from sturdy, lightweight, plastic materials.

Figure 2:
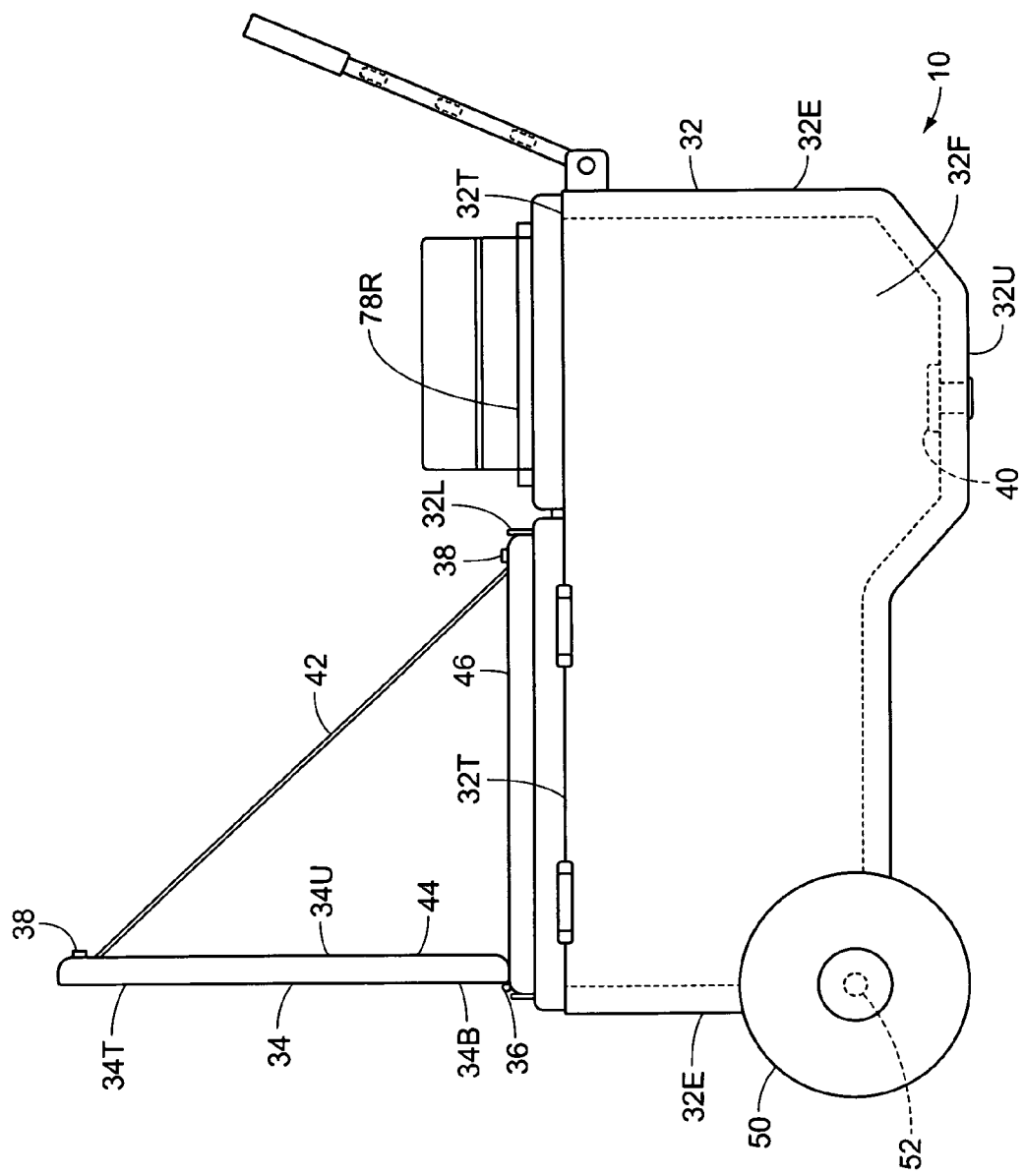
FIG. 2 is a side elevational view of the fishing box of the present invention, wherein the seat back is in the open position for exposing the removable and foldable seat cushion therein.

In FIG. 2, the main compartment 32 is illustrated. The main compartment 32 has a top 32T, an underside 32U, a front side 32F, a backside 32B, and two side ends 32E. A divider 31 extends between the two side ends 32E at the top 32T of the main compartment 32. A first lid 34, having a top 34T and a bottom 34B, is attached to the top 32T of the main compartment 32, between one side end 32E and the divider 31, shown in FIG. 4. The top 32T of the main compartment 32 has an internal lip 32L which extends inwardly. A pair of hinged connections 36 and a latching mechanism 38, both made of heavy duty and rust free metal or plastic, holds the first lid 34 onto the main compartment 32 of the cooler box 30. The hinged connections 36 are spaced apart along one of the side ends 32E of the top 34 of the main compartment 32, and along the bottom 34B of the first lid 34 for allowing the first lid 34 to rotate into an open position, as shown, and a closed position covering over the main compartment 32. The latching mechanism 38 is attached to the top 34T of the first lid 34 and the top 32T of the main compartment 32 along other of the side ends 32E for allowing the latching mechanism 38 to hold the lid securely covering the main compartment 32. A drain plug 40 is located on the underside 32U of the main compartment 32 for draining liquid from within the main compartment 32.

A pair of support extension 42, preferably rope, extend upwardly from adjacent the other side end 32E of the main compartment 32 to the top 34T of the first lid 34. The first lid 34 has an underside 34U. The underside 34U of the first lid 34 serves as a seat back 44 when the first lid 34 is open. A seat cushion 46 is placeable on the internal lip 32L within the main compartment 32. The seat cushion 46, preferably made of a polyurethane cushion having plastic hooks and tie downs, is removable and foldable and positioned for seating within the main compartment 32.

A pair of wheels 50 are attached to the underside 32U at one side end 32E of the main compartment 32. The wheels 50, preferably having a metal axle 52, are integrally attached to the main compartment 32 of the cooler 30 and are capable of supporting a weight of 300 pounds.

A retractable handle assembly 54, having double bars 56, three cross bards 58, and a gripping handle 60 extends upwardly from the other side end 32E opposite the wheels 50 and allows the user to easily pull and move the fishing box 10 for transport and storage.

Figure 3:
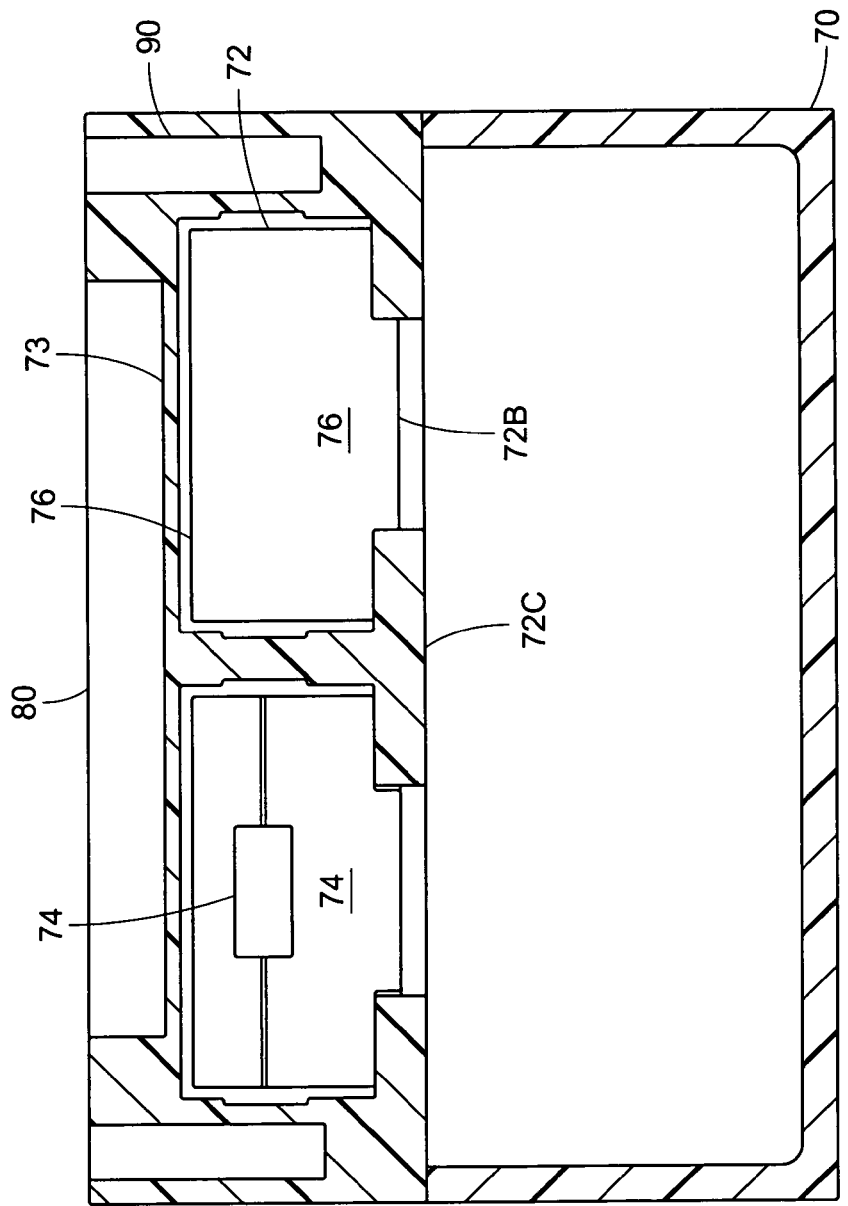
FIG. 3 is a cross sectional view of a secondary compartment of the present invention for holding a lunch box, cut bait box, and tackle box therein.

A secondary compartment 70 extends inwardly into the main compartment 32, shown in FIG. 1, from the divider 31 toward the side end 32E having the retractable handle assembly 54. FIG. 3 illustrates a cross-section view of the secondary compartment 70. FIG. 3 illustrates the secondary compartment 70 including two shelving units 72 underneath a tray 73, substantially rectangular in shape and extending above the two shelving units 72. The shelving units 72, placed below the tray 73 having a center divider 72C, and partially open bottom 72B, for sliding removable boxes in and out therefrom. A lunch box 74 and a cut bait box 76 easily slide into and out of the shelving units 72 below the tray 73. The secondary compartment 70 includes a tackle box 80. The tackle box 80 is preferably rectangular in shape and fits within the tray 73 above the shelving units 72.

FIG. 1 also illustrates the secondary compartment 70. The secondary compartment 70 also includes a second lid 78 for covering the secondary compartment 70, substantially rectangular in shape, having a top side 78T, a bottom side 78B, and an exterior surface 78E, and extending from the divider 31 to the opposite side end 32E from the first lid 34.

Figure 4:
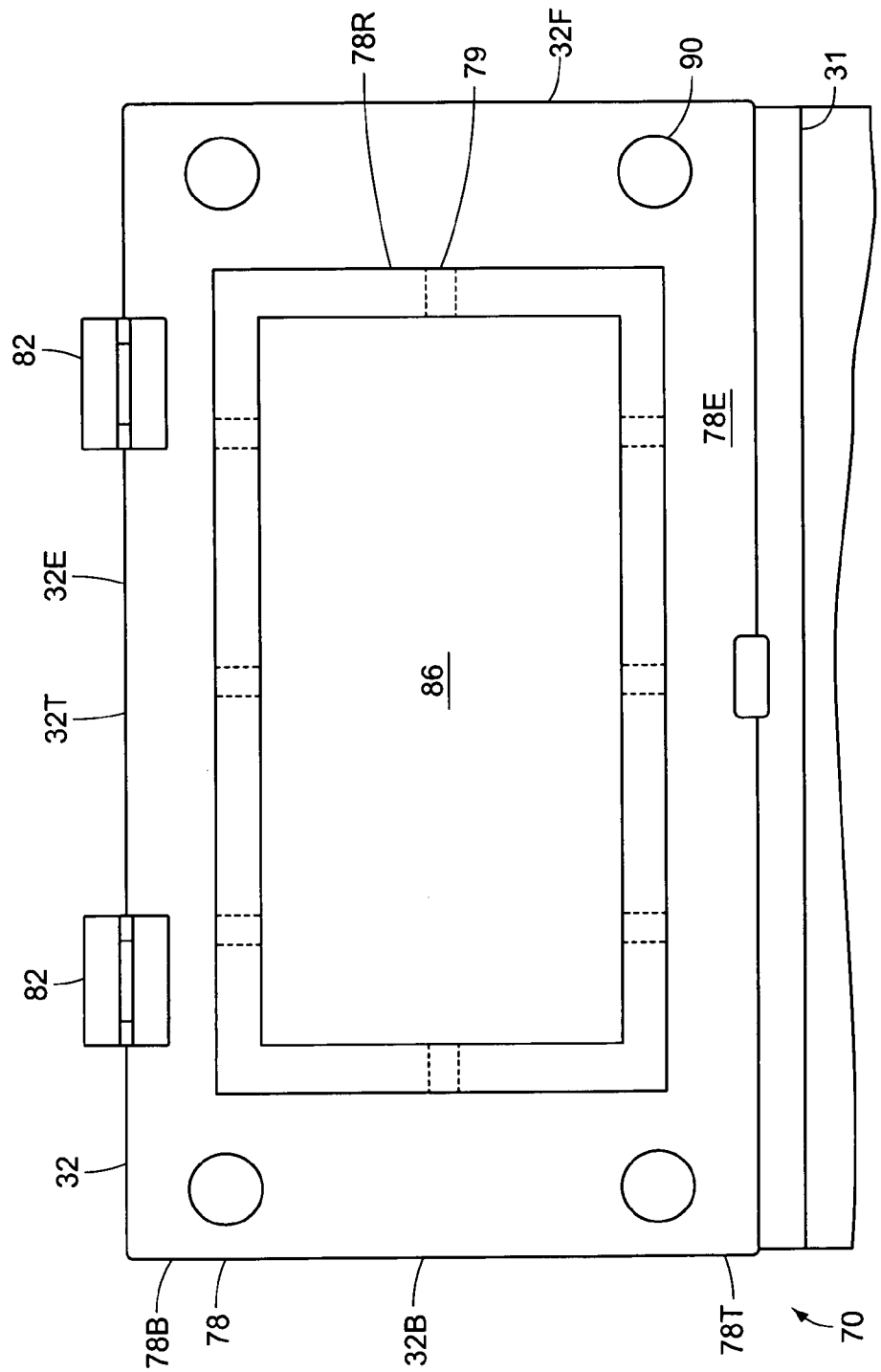
FIG. 4 is a top plan view of a lid of the tackle box of the fishing box of the present invention having a raised frame for holding additional tackle boxes thereon.

FIG. 4 illustrates a top view of the second lid 78. The second lid 78 has two hinged connections 82, attached to the bottom side 78B and one side end 32E at the top 32T of the main compartment 32 for allowing the second lid 78 to rotate upwardly and downwardly, thereby opening and closing the lid to retrieve items within the tackle box 80 and shelving units 72. The second lid 78 has a latching mechanism 84 attached to the top side 78T of the second lid 78 and the divider 31 for securely closing the second lid 78 over the secondary compartment 70. A rectangular rim 78R, smaller than the second lid 78 extends upwardly from the exterior surface 78E of the second lid 78. The rectangular rim 78R includes a plurality of eye holes 79 extending therethrough. An additional tackle box 86 can be placed within the rectangular rim 78R and held in place using bungee cords secured through the eye holds 79.

A plurality of fishing rod holders 90 extend downwardly through the second lid 78 and secondary compartment 70 for holding fishing rods and cups therein.

Figure 5:
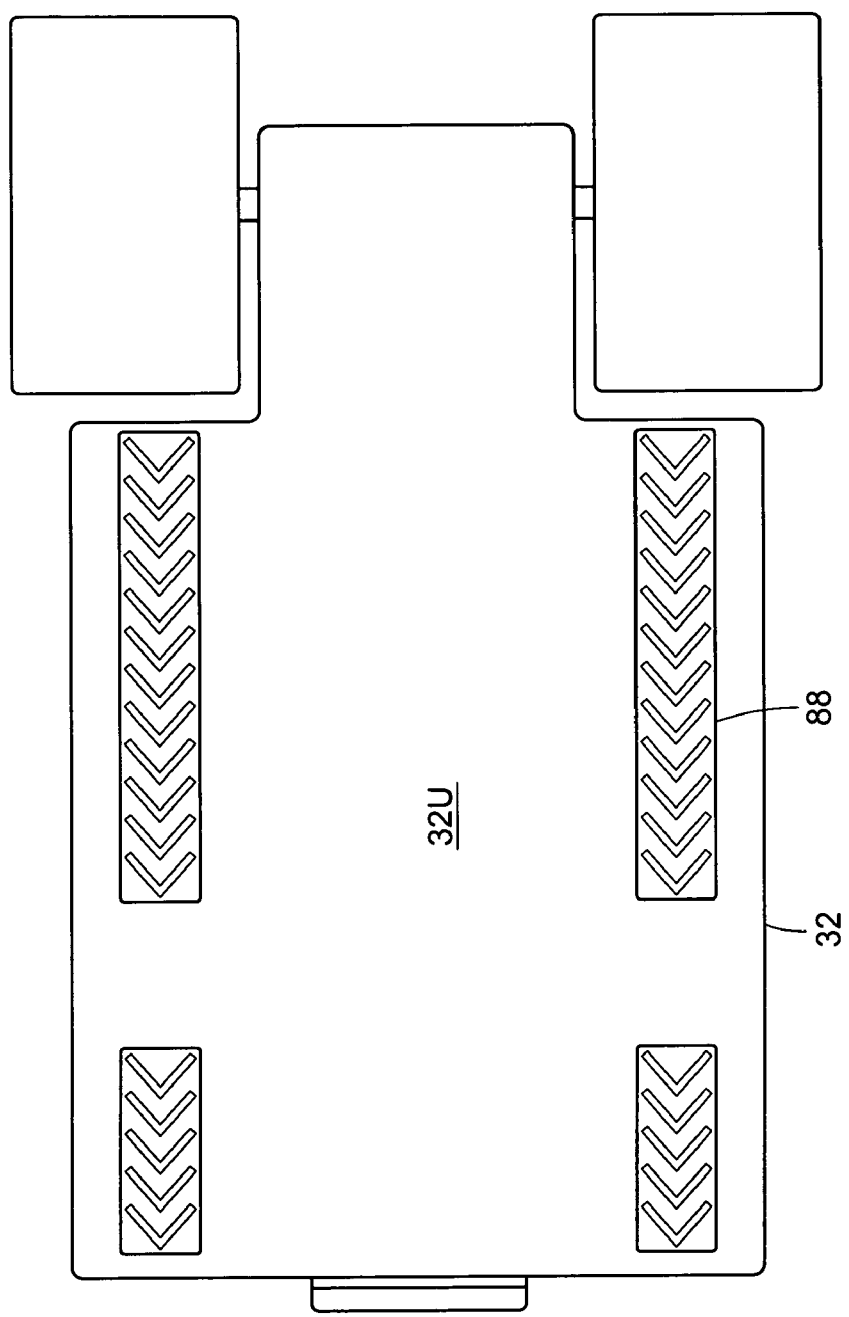
FIG. 5 is a bottom plan view of the fishing box of the present invention having wheels, a handle and a plurality of skid plates for easily moving and stabilizing the fishing box.

FIG. 5 illustrates the underside 32U of the main compartment 32. A plurality of skid plates 88 are position on the underside 32U of the main compartment 32 for preventing the fishing box 10 from slipping, sliding or skidding, and increasing stability. Preferably, the skid plates 88 are made of thick ribbed plastic for durability.

In conclusion, herein is presented a fishing box for easily and conveniently carrying several different boxes. The invention is illustrated by example in the drawing figures, and throughout the written description. It should be understood that numerous variations are possible, while adhering to the inventive concept. Such variations are contemplated as being a part of the present invention.

What is claimed is:

1. A fishing box for carrying several different items therein, comprising:

a cooler box having a main compartment substantially rectangular in shape, for holding cold beverage, ice and food therein, the main compartment having a top, an underside, a front side, a backside, and two side ends, having a divider extending between the front side and the backside at the top of the main compartment, the top of the main compartment having an internal lip which extends inwardly, having a pair of wheels including an axle, integrally attached to the underside at one of said two side ends of the main compartment;

a first lid having a top, a bottom, and an underside, and being attached to the top of the main compartment between the one of said two side ends and the divider, having a pair of support extensions extending upwardly from an other of said two side ends of the main compartment to the top of the first lid, the underside of the first lid serving as a seat back when the first lid is open;

a secondary compartment extending inwardly into the main compartment from the divider toward the other of said two side ends, having two shelving units underneath a tray, substantially rectangular in shape and extending above the two shelving units, the shelving units positionable below the tray having a center divider and a partially open bottom, having a lunch box and a cut bait box for sliding into and out of the shelving units, having a tackle box substantially rectangular in shape for fitting within the tray above the shelving units;

a second lid substantially rectangular in shape, for covering the secondary compartment, having a top side, a bottom side, and an exterior surface, and extending from the divider to the other of said two side ends opposite from the first lid;

a rectangular rim extending upwardly from the exterior surface of the second lid, the rectangular rim having a plurality of eye holes extending therethrough for holding an additional tackle box within the rectangular rim securely in position using bungee cords secured through the eye holes; and a plurality of fishing rod holders extending downwardly through the second lid and secondary compartment for holding fishing rods and cups therein.

2. The fishing box of claim 1, further comprising a pair of hinged connections and a latching mechanism for holding the first lid onto the main compartment.

3. The fishing box of claim 2, wherein the hinged connections are spaced apart along the one of said two side ends of the top of the main compartment, and along the bottom of the first lid for allowing the first lid to rotate into an open position and a closed position covering over the main compartment.

4. The fishing box of claim 3, wherein the latching mechanism is attached to the top of the first lid and the top of the main compartment along the other of said two side ends for allowing the latching mechanism to hold the first lid securely covering the main compartment.

5. The fishing box of claim 4, wherein the cooler has a drain plug located on the underside of the main compartment for draining liquid therefrom.

6. The fishing box of claim 5, further comprising a removable and foldable seat cushion being fitted onto the internal lip within the main compartment for sitting thereon.

7. The fishing box of claim 6, wherein the second lid has two hinged connections and a latching mechanism for securing the second lid over the second compartment.

8. The fishing box of claim 7, wherein the two hinged connections are attached to the bottom side and the other of said two side ends at the top of the main compartment for allowing the second lid to rotate upwardly and downwardly, thereby opening and closing the second lid to retrieve items within the tackle box and shelving units.

9. The fishing box of claim 8, wherein the latching mechanism is attached to the top side of the second lid and the divider for securely closing the second lid over the secondary compartment.

10. The fishing box of claim 9, further comprising a retractable handle assembly having double bars, three cross bars and a gripping handle that extends upwardly from the other of said two side ends opposite the wheels.

11. The fishing box of claim 10, further comprising a plurality of skid plates positionable on the underside of the main compartment for preventing the fishing box from slipping, sliding and skidding and increasing stability.

12. A fishing box for carrying several different items therein, comprising:

a cooler box having a main compartment substantially rectangular in shape, for holding cold beverage, ice and food therein, the main compartment having a top, an underside, a front side, a backside, and two side ends, having a divider extending between the front side and the backside at the top of the main compartment, the top of the main compartment having an internal lip which extends inwardly, having a drain plug located on the underside of the main compartment for draining liquid from within the main compartment, having a pair of wheels including an axle, integrally attached to the underside at one of said two side ends of the main compartment;

a first lid having a top, a bottom, and an underside, and being attached to the top of the main compartment between the one of said two side ends and the divider, having a pair of hinged connections and a latching mechanism for holding the first lid onto the main compartment, the hinged connections being spaced apart along the one of said two side ends on the top of the main compartment, and along the bottom of the first lid for allowing the first lid to rotate into an open position and a closed position covering over the main compartment, the latching mechanism being attached to the top of the first lid and the top of the main compartment along an other of said two side ends for allowing the latching mechanism to hold the first lid securely covering the main compartment, having a pair of support extensions extending upwardly from the other of said two side ends of the main compartment to the top of the first lid, the underside of the first lid serving as a seat back when the first lid is in the open position;

a removable and foldable seat cushion being fitted onto the internal lip within the main compartment for sitting thereon;

a retractable handle assembly having double bars, three cross bars and a gripping handle that extends upwardly from the other of said two side ends opposite the wheels;

a secondary compartment extending inwardly into the main compartment from the divider toward the other of said two side ends having the retractable handle assembly, having two shelving units underneath a tray, substantially rectangular in shape and extending above the two shelving units, the shelving units positionable below the tray having a center divider and a partially open bottom, having a lunch box and a cut bait box for sliding into and out of the shelving units, having a tackle box substantially rectangular in shape for fitting within the tray above the shelving units;

a second lid, substantially rectangular in shape, for covering the secondary compartment, having a top side, a bottom side, and an exterior surface, and extending from the divider to the other of said two side ends opposite from the first lid, having two hinged connections and a latching mechanism, the two hinged connections being attached to the bottom side and the other of said two side ends at the top of the main compartment for allowing the second lid to rotate upwardly and downwardly, thereby opening and closing the second lid to retrieve items within the tackle box and shelving units, the latching mechanism being attached to the top side of the second lid and the divider for securely closing the second lid over the secondary compartment;

a rectangular rim extending upwardly from the exterior surface of the second lid, the rectangular rim having a plurality of eye holes extending therethrough for holding an additional tackle box within the rectangular rim securely in position using bungee cords secured through the eye holes;

a plurality of fishing rod holders extending downwardly through the second lid and secondary compartment for holding fishing rods and cups therein; and a plurality of skid plates positionable on the underside of the main compartment for preventing the fishing box from slipping, sliding and skidding, and increasing stability.

* * * * *